United States Patent [19]

Allen et al.

[11] Patent Number: 4,847,340
[45] Date of Patent: * Jul. 11, 1989

[54] NOVEL PROPYLENE POLYMERIZATION PROCESS

[75] Inventors: George C. Allen; Brian J. Pellon; Michael P. Hughes, all of Odessa, Tex.

[73] Assignee: Rexene Products Company, Odessa, Tex.

[ * ] Notice: The portion of the term of this patent subsequent to Apr. 5, 2005 has been disclaimed.

[21] Appl. No.: 156,047

[22] Filed: Feb. 16, 1988

Related U.S. Application Data

[63] Continuation-in-part of Ser. No. 880,456, Jun. 30, 1986, Pat. No. 4,736,002.

[51] Int. Cl.$^4$ .................. C08F 4/64; C08F 210/16
[52] U.S. Cl. ..................... 526/125; 526/348; 526/906
[58] Field of Search ......................... 526/125

[56] References Cited

U.S. PATENT DOCUMENTS

| | | | |
|---|---|---|---|
| 3,789,036 | 1/1974 | Longi et al. | 526/125 |
| 4,175,171 | 11/1979 | Ito et al. | 526/125 |
| 4,234,710 | 11/1980 | Moberly et al. | 526/125 |
| 4,314,911 | 2/1982 | Giannini et al. | 526/125 |
| 4,322,514 | 3/1982 | Miyoshi et al. | 526/125 |

Primary Examiner—Edward J. Smith
Attorney, Agent, or Firm—Fred S. Valles; Margareta LeMaire

[57] ABSTRACT

A novel highly efficient process is disclosed for the production of substantially amorphous ethylene-propylene copolymers. The polymers have properties which make them applicable for use, e.g., as hot melt adhesives, as blending components in roofing materials, and as cable and wire flooding agents.

18 Claims, No Drawings

４,847,340

NOVEL PROPYLENE POLYMERIZATION PROCESS

This application is a continuation-in-part of copending application Ser. No. 880,456 filed June 30, 1986, now U.S. Pat. No. 4,736,002.

BACKGROUND OF THE INVENTION

In the manufacture of propylene homopolymers and copolymers, conventional polymerization techniques using unsupported catalysts result in the simultaneous production of substantial quantities of atactic polymer in addition to the desired product of high crystallinity and isotacticity. Various methods have been employed for the purification and separation of these two polymers. The by-products, i.e., the atactic polymer of low crystallinity is being utilized commercially as a component in various adhesive compositions, roofing materials, caulking compounds, etc.

Recently, developments have been made of new catalysts which are highly active and more stereospecific than the afore-mentioned conventional catalysts. The proportions of atactic polymer in the polymers produced employing these catalysts are substantially reduced and therefore the polymer product generally does not require any purification for removal of the atactic or low crystalline polymer. Because of the rapid adaptation of existing polymer facilities to the use of these new catalysts, there has been generated a serious shortage of low-crystalline, atactic polymers.

U.S. Pat. No. 3,789,036 to Longi et al. discloses a process for the production of ethylene-propylene elastomers containing between about 20 and about 70 wt. % ethylene using a magnesium-supported titanium catalyst, e.g., a co-ground mixture of titanium tetrachloride and magnesium chloride. It has been found that this catalyst is not very active and, therefore, the polymer produced in the process contains undesirably large quantities of catalyst residues. Secondly, the polymer is more crystalline than desired as measured by the m/r ratio described in detail hereinafter. Finally, because of the low catalyst activity, the catalyst costs become prohibitive.

It is therefore an object of the present invention to provide a highly efficient, novel process for the production of substantially amorphous polymers of propylene and ethylene.

THE INVENTION

In accordance with the present invention there is provided a process for the production of substantially amorphous copolymers consisting essentially of ethylene and propylene which comprises reacting from about 70 to about 96.5 wt. % propylene and from about 3.5 to about 30 wt. % ethylene at a temperature between about 130° F. and about 175° F. and at a reactor pressure sufficient to maintain propylene in the liquid phase, in the presence of from about 0.7 to about 3.0 mol % hydrogen based on the monomer feed to the process and employing as catalyst a composition of:
(a) a solid catalyst component produced by the method comprising
 (i) co-comminuting magnesium halide support base and aluminum trihalide in a molar ratio from about 8:0.5 to about 8:3 in the absence of added electron donor and
 (ii) then co-comminuting the product of step (i) in the absence of added electron donor with sufficient titanium tetrahalide to provide a molar ratio of magnesium halide to titanium tetrahalide from about 8:0.4 to about 8:1; and
(b) a co-catalyst component comprised of a mixture of from about 15 to about 100 mol % of trialkylaluminum having from 1 to 9 carbon atoms in each alkyl group and about 85 to about 0 mol % of an alkylaluminum halide having at least one halide group per molecule and from 1 to 9 carbon atoms in the alkyl group in a sufficient quantity to provide an Al/Ti ratio in the range from about 50:1 to about 600:1;
and recovering a substantially amorphous, random ethylenepropylene copolymer having a tacticity index m/r ranging between about 2.5 and about 4 as determined by $^{13}C$ NMR spectra.

Preferably, the halides are chloride, the alkyls are ethyl groups and the alkylaluminum halide contains one halide group. The invention will be descrbied hereinafter in connection with the preferred embodiments of the catalyst system.

Although the polymerization can be carried out in a batch reactor, it is preferred to utilize a continuous process to achieve the most random incorporation of the comonomer. Usually, pressures in the range between about 400 psig and about 550 psig are suitable for maintaining propylene in liquid phase, the preferred temperature is between about 150° F. and about 160° F.

The hydrogen is added to the polymerization reactor for control of polymer molecular weight and other properties at concentrations generally about 7 to 10 times the amount conventionally used in the manufacture of isotactic polymer. Moreover, as the ethylene content of the copolymer is increased, it is necessary to increase the hydrogen concentration in the reactor to maintain a copolymer having a constant melt viscosity. As an example, for a 100% increase in ethylene content about a 50% to 150% increase in hydrogen is required. The concentration of hydrogen in the total feed to the reaction zone preferably ranges between about 1.2 and about 2.5 mol %.

The solid, supported catalyst component should have a molar ratio of magnesium chloride to aluminum chloride of about 8:0.5–3.0 and preferably about 8:10–1.5.

The molar ratio of magnesium chloride to titanium tetrachloride is between about 8:0.1–1.0 and preferably about 8:0.4–0.6. A critical feature of the solid supported catalyst component is that no electron doner compounds should be used in any of the catalyst manufacturing steps. Also, the polymerization process using the catalyst should be carried out in the absence of added electron donors.

Any of the general methods described in U.S. Pat. Nos. 4,347,158 and 4,555,496 (hereby incorporated by reference in this application) can be used in preparing the solid supported catalyst component except that these methods must be modified to exclude the use of electron donor compounds. Briefly, the modified method involves co-comminuting magnesium chloride and aluminum trichloride in the absence of an electron donor and then co-comminuting the catalyst support so formed with titanium tetrachloride, also in the absence of an electron donor.

The solid catalyst component is used in conjunction with an organoaluminum co-catlyst, which, as stated above, is a mixture of from about 15 to about 100 mol % of trialkylaluminum and from about 0 to about 85 mol % dialkylaluminum chloride. At lower than 15% trialkylaluminum concentrations, the polymer productivity is drastically reduced and dialkylaluminum chloride alone fails completely to promote polymerization. When producing polymers containing more than 15 wt. % ethylene it is necessary to limit the trialkylaluminum to no more than 90 mol % or the polymer will have an m/r ratio exceeding 4.0. The preferred co-catalyst in this case is a mixture containing from about 40 to 60 mol % trialkylaluminum and 60–40 mol % dialkylaluminum chloride. At 15 wt. % or less ethylene incorporation into the polymer, 100 mol % trialkylaluminum is used with advantage. The molar ratio of total organoaluminum co-catalyst to titanium-containing catalyst component, i.e., Al/Ti ratio should range between about 50:1 and about 600:1, preferably between about 90:1 and about 300:1.

The polymerization is carried out in a stirred reactor at average residence times between about 1 hour and about 3 hours. Sufficient catalyst quantities are fed to the reactor to result in a polymer content in the reactor slurry or from about 30 wt. % to about 60 wt %. The reactor effluent is withdrawn from the reactor, an unreached monmer and hydrogen is flashed from the product polymer.

Specific catalyst used in the process of this invention has the ability to produce propylene units in the polymer with little or no control of the stereochemistry, and also to incorporate ethylene as randomly as possible to provide maximum disorder in the polymer chain.

Because of the high activity of this catalyst, the process is highly efficient and typically results in polymer productions of at least 7000 lbs polymer/lb Ti catalyst/hour.

The products of the process of this invention have a tacticity index m/r between about 2.5 and 4. This is determined directly by $^{13}C$ Nuclear Magnetic Resonance (NMR). The "m" and "r" describe the stereochemistries of pairs of contiguous propylene groups bonded to one or more ethylene groups, "m" referring to meso and "r" to racemic. An m/r ratio of 1.0 describes a syndiotatic polymer and an m/r ratio of 2.0 a truly atactic material. An isotactic material theoretically will have a ratio approaching infinity and many by-product atactic polymers have sufficient isotactic content to result in ratios of 50 and above. It has been found that the m/r ratio substantially agrees with the number average sequence length $\bar{n}$ of like groups, i.e., meso and racemic groups in case of propylene homopolymer produced under the same conditions as the random copolymer, except for the absence of ethylene in the feed. Thus, it was established that the tacticity is independent of comonomer content in the polymer. Also, the comonomer such as the ethylene is distributed throughout the polymer molecule in the most random fashion. The method used in calculating $\bar{n}$ for homopolymer is disclosed in J.C. Randall, J. POLM. SCI., POLYM. PHYS. ED., 14, 2083 (1976). The tacticity index m/r is obtained by inverting the r'/m' ratio calculated according to the method devised by H. N. Cheng, MACROMOLECULES, 17, 10950 (1984).

The novel polymer has a very low heat of fusion, as determined by Differential Scanning Calorimetry techniques (DSC), a further indication of the amorphous nature of the polymer and the lack of significant crystallinity in the polymer structure.

The polymer contains very low concentrations of catalyst residues, e.g., the total ash content is generally less than about 500 ppm and the titanium content no more than about 2 ppm and generally less than about 1 ppm.

Various additives can be incorporated into the polymer, such as antioxidants U.V. stabilizer, pigments, etcetera.

The polymer products of the process of this invention have excellent properties making them useful in a variety of applications, such as for adhesives, caulking and sealing compounds, roofing compositions, cable and wire flooding compounds, and others. By varying the comonomer content in the polymer and hydrogen addition to the reactor, it is possible to tailor the properties for any desired application. The important product properties include melt viscosity ring, and ball softening point, needle penetration, and open time.

The melt viscosity at 375° F. is determined by ASTM test method D-3236 using a Brookfield RVT Viscometer and a #27 spindle. Hydrogen is used to control molecular weight and thus melt viscosity. It has been found that at increased ethylene content more hydrogen is required to maintain a certain viscosity level. For use as wire and cable flooding compounds the preferred viscosity is between about 100 and about 500 cps. For hot melt adhesives the desired viscosity range is between about 1000 and 5000 cps at 375° F. For other applications such as bitumen-modified product, the polymer component should have a viscosity above 5000 cps, preferably in the range between about 10,000 and about 25,000 cps.

The ring and ball softening point determinations are carried out using ASTM E-28 test method. The variables affecting the softening point are ethylene content of the polymer and the triethylaluminum concentration in the organoaluminum co-catalyst used in the polymerization process. A decrease in the ethylene content as well as in diethylaluminum chloride concentration in the co-catalyst both cause an increase in the ring and bell softening point. The preferred range for this property is between about 235° F. and about 300° F.

Needle penetration is another test which measures the softness of the material, in this case by the resistance to penetration according to ASTM test method D-1321. Typically, the penetration values of the copolymers of this invention range between 10 and about 75 dmm (1 dmm=0.1 mm). The same process variables affect this property as in the case of ring and ball softening point.

Perhaps one of the most important tests of a hot melt adhesive is the open time. This test is an indication of the elapsed time available between adhesive application to kraft paper and bonding of a kraft paper laminate. This is a very important property for the user, as he must know how soon after applying the adhesive he must add the second sheet of paper. In this test, an $8\frac{1}{2}'' \times 11''$ sheet of kraft paper, rough side up is taped to a drawdown plate. A polymer sample is heated to 375° F. along with a Bird drawdown applicator. When at temperature, the applicator is placed at the top of the kraft paper and a small puddle of molten polymer is poured near the edge. The polymer is drawn into a smooth film, and as soon as the bottom of the paper is reached, a stopwatch is started. At 10-second intervals, pre-cut strips of kraft paper (rough side down transverse machine direction) are placed across the film and pressed into place with a rubber roller. After the last strip is applied, and a subsequent waiting period of 5 minutes, the strips are removed in a smooth, brisk motion. The open time is defined as the longest time when 90% or more of the fiber remains. The open times should preferably range between 10 and 60 seconds.

An additional benefit of the polymers of this invention is that they contain extremely small quantities of catalyst residues because of the very large productivity rates of the specific catalyst used in the polymerization. There is no need to remove these small amounts of catalysts from the polymer.

The following examples illustrate the invention.

EXAMPLES 1-6

Polymers were prepared in large scale continuous pilot plant operations, wherein monomers, hydrogen and catalyst components were separately and continuously charged to a stirred reactor, the total monomer feed rate corresponding to about a 2-hour residence time in the reactor. The organoaluminum compound of the catalyst system was a heptane solution of an equimolar mixture of triethylaluminum (TEA) and a diethylaluminum chloride (DEAC). The solid supported titanium tetrachloride catalyst component had a titanium content of about 2.5 wt. % and was prepared by a modification of the preferred technique disclosed in U.S. Pat. No. 4,347,158, i.e., modified only in that all process steps were carried out in the absence of any electron donor compounds. The solid catalyst component was pumped into the reactor as a 10 wt. % mixture in a blend of petrolatum and mineral oil in a 50/50 weight ratio. The two catalyst components were added at rates directly proportioned to the polymer production rates and in amounts sufficient to maintina the polymer solids concentration in the reactor slurry at values usually in the range between about 40% and about 60%. The catalyst productivity (lb polymer/lb of Ti catalyst component) was calculated in each case from the polymer slurry withdrawal rate, solids content in the slurry, and the titanium catalyst addition rate. The product polymer was separated from unreacted monomer, stabilized with Isonox ® 129 and then subjected to testing. Table 1 summarizes the pertinent operating conditions and the results of physical testing. The product characteristics of Example 1-6 all are the results of operating the process within the claimed limits of the invention.

TABLE 1

| Example No. | 1 | 2 | 3 | 4 | 5 | 6 |
|---|---|---|---|---|---|---|
| Reactor Temperature, °F. | 157 | 150 | 154 | 154 | 157 | 142 |
| Reactor Pressure, psig | 456 | 434 | 466 | 484 | 491 | 495 |
| Propylene, lbs/hr | 111 | 111 | 111 | 111 | 102 | 111 |
| Ethylene, lbs/hr | 8.8 | 9.0 | 12.0 | 12.0 | 8.5 | 12.9 |
| Hydrogen, lbs/hr | 0.14 | 0.05 | 0.06 | 0.10 | 0.06 | 0.14 |
| Al/Ti mol ratio | 311 | 289 | 301 | 299 | 263 | 291 |
| Reactor Solids, wt. % | 60.5 | 47.7 | 51 | 51 | 32 | 38 |
| Catalyst Activity, lbs/lb Catalyst/hr | 27,710 | 17,200 | 16,760 | 17,750 | 11,980 | 15,130 |
| Ethylene Content, wt. % | 12.2 | 13.5 | 14.3 | 15.5 | 17.5 | 25.7 |
| m/r Ratio | 3.1 | 3.3 | 3.8 | 3.7 | 3.7 | 3.5 |

TABLE 2

| Example No. | 1 | 2 | 3 | 4 | 5 | 6 |
|---|---|---|---|---|---|---|
| Ethylene, wt. % | 12.2 | 13.5 | 14.3 | 15.5 | 17.5 | 25.7 |
| m/r | 3.1 | 3.3 | 3.8 | 3.7 | 3.7 | 3.5 |
| $\Delta H_f$, cal/g | 0.50 | 0.50 | 0.27 | 0.33 | 0.16 | 0.00 |
| Melt Viscosity @ 375° F., cps | 3,000 | 15,000 | 7,750 | 3,780 | 9,210 | 7,900 |
| Open Time, seconds | 10 | 20 | 20 | 30 | 20 | >60 |
| Softening Point, °F. | 266 | 257 | 252 | 251 | 253 | 237 |
| Needle Penetration, 0.1 mm | 37 | 28 | 43 | 45 | 41 | 71 |
| Total Ash,(1) ppm | 124 | 200 | 205 | 194 | 287 | 230 |
| Ti,(2) ppm | 0.4 | 0.7 | 0.7 | 0.7 | 1.0 | 0.8 |
| Mg,(2) ppm | 3.5 | 5.7 | 5.9 | 5.5 | 8.2 | 6.5 |
| Al,(2) ppm | 62 | 100 | 103 | 97 | 144 | 115 |

(1)Calculated as metal oxides.
(2)Calculated as metal.

COMPARATIVE EXAMPLE 7

In this comparative example, the conditions of Example 6 of U. S. Pat. No. 3,789,036 to Longi et al. were slightly modified in order to obtain a product containing ethylene below 30 wt. % and having measurable properties of melt viscosity, softening point, and needle penetration. Thus, the catalyst was prepared by adding 29.7 g anhydrous magnesium chloride and 1.25 g titanium tetrachloride to a steel mill having a volume of 0.6 liter and provided with 191 stainless steel balls weighing 1683 g. The mixture was milled under a nitrogen atmosphere for 64 hours at 20° C. A 1-liter reactor was purged with $N_2$ and 2.7 ml of 25% triisobutyl aluminum in heptane and 1.76 ml of 1% catalyst in mineral oil (0.0157 g) were added. Hydrogen was added to equal a reactor pressure of 100 psig (reactor pressure prior to hydrogen addition is <1 psig). 160 g of propylene was added and the temperature increased to 60° C. (reactor pressure=490 psig). Ethylene was then added to equal a total reactor pressure of 515 psig and was maintained at this level for 4 hours. 58 g of polymer were obtained indicating a catalyst activity of 925 g/g catalyst/hr. For ready comparison, the properties of the resulting polymer are shown in Table 3 together with those of Example 6.

TABLE 3

| Example No. | 6 | Comp. 7 |
|---|---|---|
| Catalyst Activity, lbs/lb Catalyst/hr | 15,130 | 925 |
| Ethylene, wt. % | 25.7 | 27.3 |
| m/r | 3.5 | 4.8 |
| Melt Viscosity @ 375° F., cps | 7,900 | 6,613 |
| Softening Point, °F. | 237 | 236 |
| Needle Penetration, 0.1 mm | 71 | 87 |
| Total Ash,(1) ppm | 230 | 1,766 |
| Ti,(2) ppm | 0.8 | 2.1 |
| Mg,(2) ppm | 6.5 | 51.0 |
| Al,(2) ppm | 115 | 889 |

(1)Calculated as metal oxides.
(2)Calculated as metal.

As seen from the above data, the two polymer products were quite similar in ethylene content, melt viscosity, and softening point. However, the use of the Longi et al. catalyst in comparative Example 7 resulted in a polymer having an m/r ratio above the critical value of 4.0 of the present invention. Also, because of the much lower catalyst activity of the Longi et al. catalyst compared to that of Example 6, i.e., 925 versus 15,130 lbs polymer/lb catalyst/hour, the ash as well as the residual catalyst contents of the Example 7 polymer were significantly higher than those of the polymer of Example 6, e.g., total ash content of 1766 ppm versus 230.

EXAMPLE 8-10

These three examples were carried out using subtantially the same operating conditions as those of Examples 1-6, except for the following: the organoaluminum compound was fed to the reactor as a pure stream of triethylaluminum, and the solid catalyst component containing about 2.5 wt. % titanium was pumped into the reactor as a 6 wt. % mixture in pure petrolatum. The residence time was 1.8 hours and the solids concentration in the reactor was maintained at about 40 wt. %. The nominal operating conditions and the polymer product properties are shown in Table 4.

TABLE 4

| Example No. | 8 | 9 | 10 |
|---|---|---|---|
| Reactor Temp., °F. | 155 | 155 | 155 |
| Reactor Press., psig | 410 | 435 | 465 |
| Propylene, lbs/hr | 4,100 | 3,500 | 3,500 |
| Ethylene, lbs/hr | 85 | 213 | 468 |
| Hydrogen, lbs/hr | 1.6 | 2.5 | 3.3 |
| Al/Ti mol ratio | 250 | 250 | 250 |
| Catalyst Activity, lbs/lb Catalyst/hr | 8,300 | 11,100 | 13,900 |
| Ethylene Content, wt. % | 3.8 | 6.9 | 13.6 |
| m/r Ratio | 2.6 | 3.1 | 3.5 |
| Melt Viscosity @ 375° F., cps | 7,750 | 3,185 | 3,350 |
| Ring and Ball Softening Point, °F. | 296 | 283 | 264 |
| Needle Penetration, 0.1 mm | 12 | 25 | 45 |
| $\Delta H_f$, cal/g (DSC) | 3.3 | 2.3 | 1.3 |
| Total Ash,[1] ppm | 459 | 344 | 275 |
| Ti,[2] ppm | 1.6 | 1.2 | 1.0 |
| Mg,[2] ppm | 13.1 | 9.8 | 7.9 |
| Al,[2] ppm | 230 | 173 | 138 |

[1] Calculated as metal oxides.
[2] Calculated as metal.

COMPARATIVE EXAMPLES 11-13

These comparative examples demonstrate the necessity of using a mixture of trialkylaluminum and dialkylaluminum halide co-catalyst when producing polymers having ethylene contents above 15 wt. % in acceptable yields and having the m/r ratio in the required range.

The experiments were performed in a 1-liter, jacketed autoclave equipped with a magnetically coupled stirrer. The temperature of the autoclave was controlled by the use of a mixture of equal weights of glycol and water as the heat transfer fluid flowing through the jacket. The temperature of this fluid was controlled by a microprocessor whose temperature indicator was an iron/-constantin thermocouple inside the autoclave. With this system, set point temperature could be maintained ±0.2° C. All monomers were polymerization grade, 99.9% pure, and were also passed through molecualr sieve beds, as well as beds of copper catalyst for oxygen removal, prior to use. Hydrogen was ultrahigh purity, 99.99% and used as is. Aluminum alkyl solutions were purchased as 25% W/W in normal heptane and were used as is. One wt. % catalyst slurries were prepared in degassed mineral oil using catalysts of the same type as that in Example 1-8. Prior to each use, the autoclaves were heated to 90° C. with a slow nitrogen purge for 30 minutes. After cooling to 30° C., the nitrogen atmosphere was replaced with propylene purge. Alkyl solutions and catalyst slurries were prepared in septum vials in dry boxes (nitrogen atmosphere), purged with nitrogen upon removal, and pressurized slightly to avoid contamination. Alkyl solutions and catalyst slurries were introduced into the reactors using hypodermic syringes, previously cleaned with de-ionized water, dried at 120° C., and purged with nitrogen prior to use. In Example 11, 0.34 ml TEA, 0.34 DEAC $(Al-1.77\times10^{-3}$ mole /l), and 0.58 ml of 1% W/W catalyst slurry (2.5% W/W titanium content) were added to the autoclave. Hydrogen was added to equal a partial pressure of 70 psig. 0.6 liters of propylene was introduced using a sight gauge and nitrogen pressure. The reactor content was heated to 60° C. and maintained while stirring at 500 rpm. As soon as the temperature stabilized at 60° C. (5-10 minutes), ethylene was added to the reactor to maintain a constant overpressure of 50 psig greater than the reactor pressure. After 1 hour, the temperature was lowered and excess propylene vented. The ethylene-propylene copoymer was dried under vacuum at 40° C. overnight.

In Example 12 0.68 ml TEA was used exclusively while in Example 13 the same amount of DEAC only was added. Table 4 lists the pertinent data of these comparative examples.

TABLE 4

| Example No. | Ex. 11 | Comp. 12 | Comp. 13 |
|---|---|---|---|
| Co-Catalyst, % | | | |
| TEA | 50 | 100 | — |
| DEAC | 50 | — | 100 |
| Catalyst Activity, Kg/g/hr | 20.6 | 20.0 | 0.0 |
| Ethylene, wt. % | 21.1 | 18.1 | — |
| m/r Ratio | 3.3 | 4.2 | — |
| Melt Viscosity @ 375° F., cps | 2810 | 3700 | — |
| Open Time, seconds | >60 | >60 | — |
| Softening Point, °F. | 260 | 275 | — |
| Needle Penetration, 0.1 mm | 71 | 43 | — |

As seen from the above data, the use of 100% TEA instead of a mixture of TEA and DEAC (as in Example 11) resulted in an unacceptable m/r ratio of the polymer product. The use of 100% DEAC as co-catalyst resulted in no formation of polymer.

It is to be understood that many alterations and modifications can be made to the process of this invention. All such departures are considered within the scope of this invention as defined by the specifications and appended claims.

What is claimed is:

1. A process for the production of substantially amorphous copolymers consisting essentially of ethylene and propylene which comprises reacting from about 70 to about 96.5 wt. % propylene and from about 3.5 to about 30 wt. % ethylene at a temperature between about 130° F. and about 175° F. and at a reactor pressure sufficient to maintain propylene in the liquid phase, in the presence of from about 0.7 to about 3.0 mol % hydrogen based on the monomer feed to the process and employing as catalyst a composition of:
  (a) a solid catalyst component produced by the method comprising
    (i) co-communicating magnesium halide support base and aluminum trihalide in a molar ratio from about 8:0.5 to about 8:3 in the absence of added electron donor and (ii) then co-comminuting the product of step (i) in the absence of added electron donor with sufficient titanium tetrahalide to provide a molar ratio of magnesium halide to titanium tetrahalide from about 8:0.4 to about 8:1; and (b) a co-catalyst component comprised of a mixture of from about 15 to about 100 mol % of trialkylaluminum having from 1 to 9 carbon atoms in each alkyl group and about 85 to about 0 mol % of an alkylaluminum halide having at least one halide group per molecule and from 1 to 9 carbon atoms in the alkyl group in a sufficient quantity to provide an Al/Ti ratio in the range from about 50:1 to about 600:1;

and recovering a substantially amorphous, random ethylenepropylene copolymer having a tacticity index m/r ranging between about 2.5 and about 4 as determined by $^{13}$C NMR spectra.

2. The process of claim 1 wherein each halide is a chloride and each alkyl is an ethyl group.

3. The process of claim 1 wherein said pressure is between about 400 psig and about 550 psig and the temperature is between about 150° F. and 160° F.

4. The process of claim 1 wherein said magnesium halide to aluminum trihalide ratio ranges from about 8:1 to about 8:1.5.

5. The process of claim 1 wherein said magnesium halide to titanium tetrahalide ranges from about 8:0.4 to about 8:0.6.

6. The process of claim 1 wherein the triethylaluminum content of the co-catalyst mixture ranges between about 40 and about 60 mol %.

7. The process of claim 1 wherein the co-catalyst component consists of about 10)% trialkylaluminum and the ethylene content of the recovered copolymer is no more than 15 wt %.

8. The process of claim 1 wherein the Al/Ti ratio is maintained between about 90:1 and about 300:1.

9. The process of claim 1 wherein the hydrogen is maintained between about 1.2 and about 2.5 mol % based on the total monomer feed to the process.

10. The process of claim 1 carried out under continuous conditions at an average residence time between about 1 hour and about 3 hours.

11. The process of claim 1 wherein the solids content of the reactor slurry is maintained between about 30 wt. % and about 60 wt. %.

12. The process of claim 1 wherein the catalyst composition has a activity of at least 7000 lbs polymer/lb Ti catalyst/hour.

13. The process of claim 1 wherein the recovered copolymer has a melt viscosity between about 100 and about 25,000 cps @375° F.

14. The process of claim 1 wherein the recovered copolymer has a ring and ball softening point between about 235° F. and about 300° F.

15. The process of claim 1 wherein the recovered copolymer has a needle penetration value between about 10 and about 75 dmm.

16. The process of claim 1 wherein the recovered copolymer has an open time between about 10 and about 60 seconds.

17. The process of claim 12 wherein the recovered copolymer has a total ash content of less than about 500 ppm.

18. The process of claim 12 wherein the recovered copolymer has a titanium content of no more than about 2 ppm.

* * * * *